(12) United States Patent
Gatter et al.

(10) Patent No.: US 6,797,970 B1
(45) Date of Patent: Sep. 28, 2004

(54) DEVICE FOR DISINFECTING WATER FLOWING THROUGH A SANITARY SYSTEM

(75) Inventors: Raimond Gatter, Uznach (CH); Erwin Reich; Horst Kunkel, both of Stuttgart (DE)

(73) Assignee: Hansa Metallwerke AG (DE)

( * ) Notice: Subject to any disclaimer, the term of this patent is extended or adjusted under 35 U.S.C. 154(b) by 0 days.

(21) Appl. No.: 09/529,931
(22) PCT Filed: Jul. 22, 1999
(86) PCT No.: PCT/EP99/05228
§ 371 (c)(1), (2), (4) Date: Jun. 26, 2000
(87) PCT Pub. No.: WO00/10923
PCT Pub. Date: Mar. 2, 2000

(30) Foreign Application Priority Data

Aug. 21, 1998 (DE) .......................... 198 38 006

(51) Int. Cl.[7] .............. G02F 1/32; B01J 19/08
(52) U.S. Cl. .............. 250/504 R; 210/748; 422/186.01; 250/436
(58) Field of Search .............. 210/748, 120; 422/24; 250/504 R, 436

(56) References Cited

U.S. PATENT DOCUMENTS

| | | | | |
|---|---|---|---|---|
| 4,826,035 A | * | 5/1989 | Suzuki et al. .......... 220/203.01 |
| 5,474,748 A | * | 12/1995 | Szabo .................. 250/436 |
| 5,540,848 A | | 7/1996 | Engelhard | |
| 6,120,691 A | * | 9/2000 | Mancil ................. 210/748 |
| 6,348,151 B1 | * | 2/2002 | Kunkel ................ 210/198.1 |
| 2002/0002912 A1 | * | 1/2002 | Iwata et al. ............ 99/360 |

FOREIGN PATENT DOCUMENTS

| | | | |
|---|---|---|---|
| DE | 39 24 349 A1 | 7/1989 | .............. A61L/2/10 |
| DE | G 90 16 603.5 | 12/1990 | .............. C02F/1/00 |
| DE | G 92 00 392.3 | 1/1992 | .............. C02F/1/32 |
| DE | 296 14 998 U1 | 5/1996 | .............. E03C/1/04 |
| EP | 0 508 338 A1 | 4/1992 | .............. C02F/1/32 |

OTHER PUBLICATIONS

Deutsches Patent–und Markenamt, Apr. 21, 1999, 138 38 006.2–41.
Patent Abstract of Japan, Publication No. 08/066,677, Date Dec. 12, 1996, Applicant Honda Hajime.
Patent Specification 1,159,306; Fluid Sterilisation Apparatus.
Brevet D'Invention, 1,295,774; Feuillet; Feb. 5, 1962.
WO 95/19188, Jul. 20, 1995, UV Disinfection Unit.
WO 96/22944; Jan. 8, 1996; Ultraviolet Sterilzer and Source of IonizedMolecules.
International Search Report for PCT/EP99/05228; 4 pgs.

* cited by examiner

Primary Examiner—Jack Berman
Assistant Examiner—Johnnie L Smith, II

(57) ABSTRACT

A device for sterilizing water flowing through a sanitary appliance has a housing, which comprises an inlet and an outlet for the water; a UV lamp, which is disposed inside the housing and the radiation of which is directed towards the water flowing through; and a throughflow chamber for the water, which is disposed in the housing and surrounds the UV lamp.

5 Claims, 3 Drawing Sheets

DEVICE FOR DISINFECTING WATER FLOWING THROUGH A SANITARY SYSTEM

Figure 1:
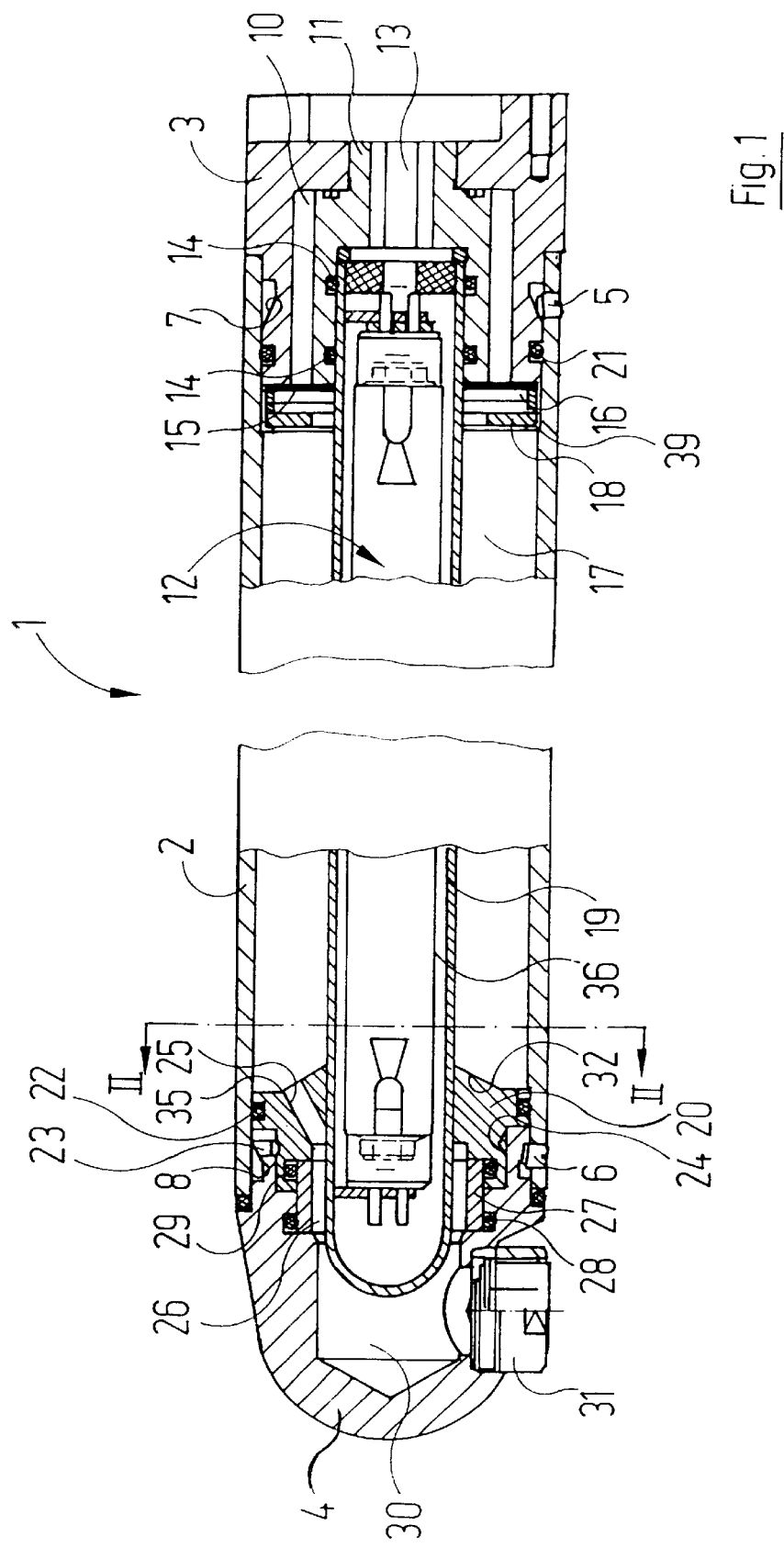

The invention relates to a device for sterilizing water flowing through a sanitary appliance, having
a) a housing, which comprises an inlet and an outlet for the water;
b) a UV lamp, which is disposed inside the housing and the radiation of which is directed towards the water flowing through; and
c) a throughflow chamber for the water, which is disposed in the housing and surrounds the UV lamp.

In recent years the dangers arising in the field of sanitation from water contaminated with micro-organisms, in particular bacteria, amoebae or other monocellular organisms, have become ever clearer. For said reason, increased importance is being attached to water sterilization. In said connection, there have been reports of experiments to sterilize flowing water through exposure to UV light, which is of a wavelength suitable for killing micro-organisms carried along in the water.

Such devices therefore irradiate, and hence sterilize, the water flowing through the throughflow chamber. The efficiency of such a device is influenced not only by the operating parameters of the lamp but also by whether the water actually flows through the entire throughflow chamber. Any dead spaces, in which air or other gases collect, inside the throughflow chamber lead to non-optimum efficiency of the UV lamp because this means that not all of the throughflow chamber accessible to irradiation is available for sterilizing purposes. If, allowing for such dead spaces, an adequate sterilizing effect is nevertheless to be achieved, a corresponding increase in the lamp wattage is therefore necessary. This is, on the one hand, expensive and may, on the other hand, lead to undesirable side effects such as an increase in the temperature of the removed water and/or of the sanitary appliance.

The object of the present invention is therefore to develop a device of the type described initially in such a way that the sterilizing efficiency of the UV lamp is increased.

Said object is achieved according to the invention in that a venting device is provided which removes the air or gas, which collects in the throughflow chamber, through the outlet.

Such a venting device eliminates the previously described dead spaces and therefore increases the sterilizing efficiency of the UV lamp and hence of the entire device. By virtue of the fact that removal of the air or gas, which undesirably collects in the dead spaces, is effected through the outlet, it is not necessary to provide special vent bores in the housing of the sanitary appliance, which would additionally entail measures to prevent water escaping from the sanitary appliance.

In an advantageous refinement of the invention, the venting device comprises a constriction of the flow area in the region of the downstream end of the throughflow chamber. Such a constriction leads to an increase of the flow rate of the water flowing, during removal, through the region of the constriction. Air or gas bubbles situated in the upstream catchment area of said increased flow rate are, as it were, sucked out of the throughflow chamber and so troublesome dead spaces are eliminated.

The constriction of the flow area is advantageously formed by a discharge bore in a partition between the throughflow chamber and an outlet chamber. In said manner, the constriction may be easily and inexpensively realized. The previously described suction characteristic of said constriction may be adapted by means of the pipe diameter to the prevailing conditions.

In a further advantageous refinement of the invention, the throughflow chamber is so designed that its highest region is situated at the downstream end of the throughflow chamber. The result of such a design is that air or gas bubbles forming in the throughflow chamber are conveyed, on the one hand, by virtue of the flow action and, on the other hand, by virtue of their buoyancy towards the downstream end of the throughflow chamber, where they may then be removed through the outlet.

The longitudinal axis of the throughflow chamber is in said case advantageously inclined relative to the horizontal. Thus, the previously described design of the throughflow chamber may be achieved without incurring additional outlay for manufacturing its shape.

Figure 2:
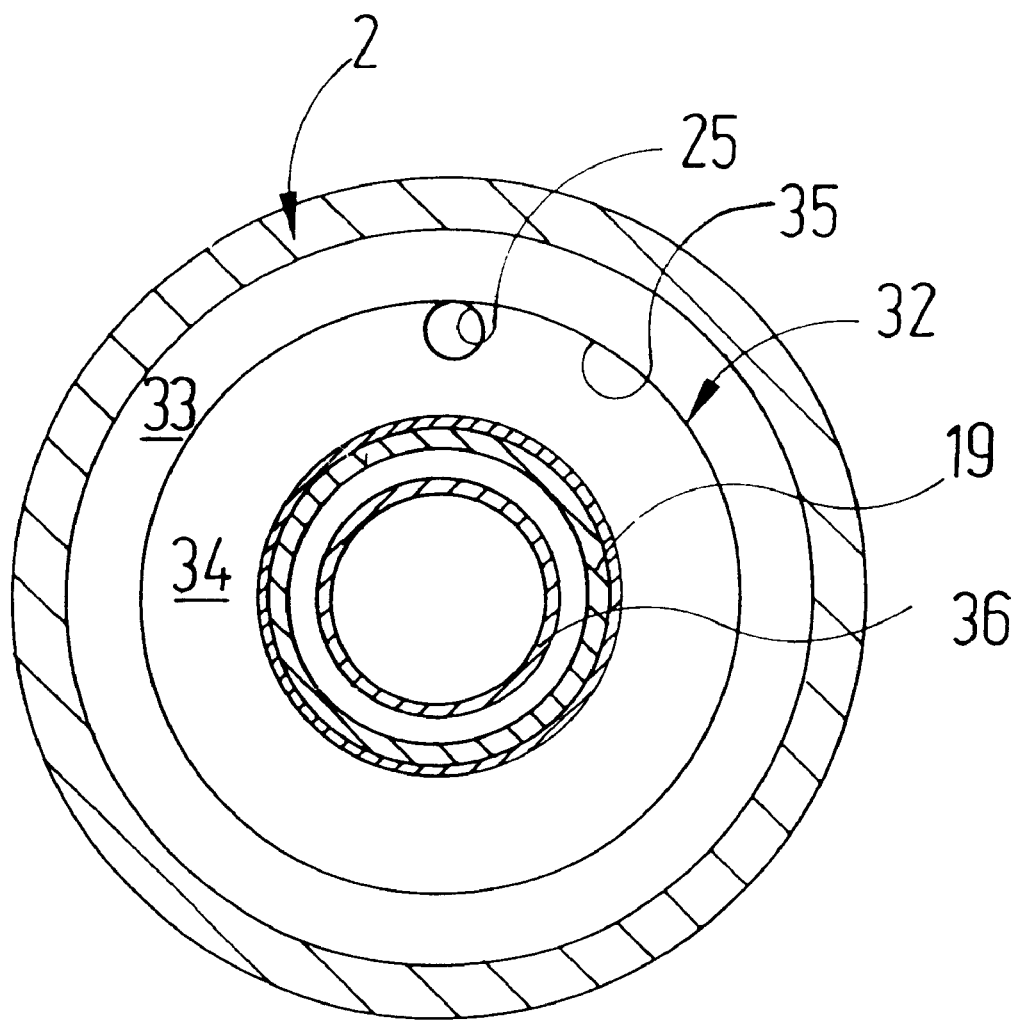
Figure 3:
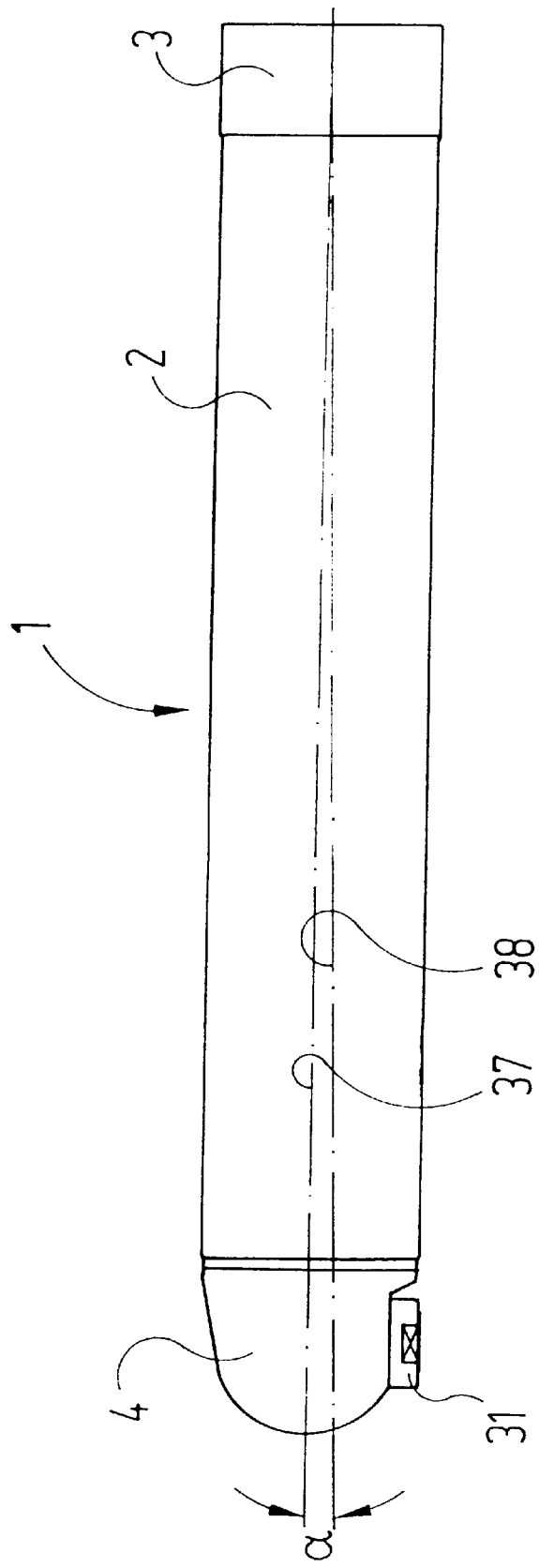

An embodiment of the invention is described in greater detail below with reference to the drawings; said drawings show:

FIG. 1 an interrupted section through a bathtub outlet, which is provided with a device for sterilizing water running through it;

FIG. 2 a section through FIG. 1 along line II—II to a slightly enlarged scale; and FIG. 3 a side view of the entire bathtub outlet in assembled position.

The bathtub outlet, which is denoted as a whole by the reference character 1, comprises a substantially hollow-cylindrical housing jacket 2 which is closed at one end, situated on the right in FIG. 1 and adjacent to a building wall, by an assembly base 3 and at its opposite end by an outlet head 4. Assembly base 3 and outlet head 4 are fitted on the housing jacket 2 in each case by means of a grub screw 5 or 6, which penetrates the housing jacket 2 and engages into a circumferential groove 7 or 8 in the assembly base 3 or outlet head 4 respectively.

The water for removal through the bathtub outlet 1 is introduced via a water supply connection (not shown in the drawings) initially into an annular inlet 10 of the bathtub outlet 1 situated inside the assembly base 3. The inlet 10 is delimited in a radially inward direction by a backplate 11 for holding a UV lamp denoted as a whole by 12. Besides the holder for the UV lamp 12, the backplate 11 comprises a bushing 13 for receiving electric connecting cables (not shown) of the UV lamp 12. The end of the UV lamp 12 directed towards the backplate 11 is sealed off to prevent water penetration by means of two sealing rings 14, which are situated in corresponding inner circumferential grooves of the backplate 11.

From the inlet 10 the water passes through a screen 15, which is fitted into the housing jacket 2 by means of a flange ring 39, into an ante-chamber 16. Upon transfer from said ante-chamber 16 into a throughflow chamber 17, the water has to overcome the increased flow resistance of an annular baffle plate 18, which reduces the flow area in such a way that it is limited to a radially inner sub-region of the original flow area. The throughflow chamber 17 is substantially in the shape of a hollow cylinder, of which the outer lateral surface is formed by the housing jacket 2 and the inner lateral surface is formed by a protective tube 19. The protective tube 19 at its upstream end is sealed by the backplate 11 and at its downstream end is integrally closed. It is made of UV-transmitting quartz glass. At its downstream end face, the throughflow chamber 17 is delimited by a through-insert 20. Upstream relative to the assembly base 3 and downstream relative to the through-insert 20 the throughflow chamber 17 is sealed off from the outside by sealing rings 21 and 22, which are situated in corresponding circumferential grooves of the assembly base 3 and through-insert 20 respectively.

The through-insert 20 is fixed on the outlet head 4 by means of a grub screw 23, which penetrates the outlet head 4 and engages into a circumferential groove 24 in the through-insert 20.

Opening into an end face 32 of the through-insert 20 delimiting the throughflow chamber 17 is a through-bore 25, which is situated in FIG. 1 above the UV lamp 12 and connects the throughflow chamber 17 to an annular sub-chamber 26. The radially outer surface of the sub-chamber 26 is formed by a ring 27, which transmits UV light and around which are disposed two sealing rings 28 and 29, which are situated in corresponding circumferential grooves of the through-insert 20 and outlet head 4 respectively and seal off the sub-chamber 26 from the outside.

From the sub-chamber 26 the water finally flows into an outlet chamber 30, which is delimited by the downstream end of the protective tube 19 and by the outlet head 4 and communicates with an air spout 31.

The sectional view of FIG. 2 shows how the through-bore 25 is positioned at the end face 32 of the through-insert 20 forming the downstream delimitation of the throughflow chamber 17. A radially outer surface region 33 of the end face 32 extends perpendicular to the lamp axis, while a radially inner surface region 34 takes the form of a conical surface, which is inclined in such a way that the axial dimension of the through-insert 20 increases in the direction of the UV lamp 12. The—in FIG. 2—top edge, which the through-bore 25 together with the end face 32 forms, coincides with the edge region 35 which is formed by the adjacent surface regions 33 and 34.

FIG. 2 shows, from the inside out, the following concentrically disposed elements (cf. also FIG. 1): a hollow-cylindrical lamp body 36 of the UV lamp 12, the protective tube 19, the end face 32 and the housing jacket 2.

As FIG. 3 reveals, in the assembled position the centre line 37 of the bathtub outlet 1 is inclined relative to the horizontal in such a way that the downstream end of the bathtub outlet 1 is higher than the upstream end. The angle between the centre line 37 and the horizontal 38 is denoted by α.

The venting device of the described device for sterilizing water operates as follows:

When a valve (not shown in the drawings) is opened, water flows via the inlet 10, past the screen 15 and the baffle plate 18 into the throughflow chamber 17. From the throughflow chamber 17 the water flows through the through-bore 25 and the sub-chamber 26 into the outlet chamber 30, which communicates with the air spout 31 and from which the water is removed. Air bubbles, which are situated during removal in the throughflow chamber 17, move under the effect of buoyancy, optionally also assisted by the entraining power of the water, into the highest region of the throughflow chamber 17. Said region, owing to the inclination of the bathtub outlet 1 described in connection with FIG. 3, is the region in the vicinity of the through-bore 25. The air, which collects there under the effect of buoyancy and as a result of the flow of the removed water, is entrained out of said region, as a result of the increased flow rate inside the through-bore 25, and through the latter and removed through the outlet head 4 and the air spout 31. The throughflow chamber 17 is therefore constantly vented during water removal.

What is claimed is:

1. A device for sterilizing water flowing through a sanitary appliance, having
    a) a housing, which comprises an inlet and an outlet for the water;
    b) a UV lamp, which is disposed inside the housing and the radiation of which is directed towards the water flowing through; and
    c) a throughflow chamber for the water, which is disposed in the housing and surrounds the UV lamp;
    wherein
    d) a venting device (25) is provided which removes the air or gas, which collects in the throughflow chamber (17), through the outlet (4).

2. A device as claimed in claim 1, wherein the venting device (25) comprises a constriction of the flow area in the region of the downstream end of the throughflow chamber (17).

3. A device as claimed in claim 2, wherein the constriction of the flow area is formed by a discharge bore (25) in a partition (20) between the throughflow chamber (17) and an outlet chamber (30).

4. A device as claimed in claim 3, wherein the uppermost portion (9) of the throughflow chamber (17) is situated at the downstream end of the throughflow chamber (17).

5. A device as claimed in claim 4, wherein the longitudinal axis (37) of the throughflow chamber (17) is inclined relative to the horizontal (38).

* * * * *